United States Patent [19]

Martinet et al.

[11] 4,238,901
[45] Dec. 16, 1980

[54] SPINNER-CASE

[76] Inventors: Rene' Martinet, 51, rue Jean Richepin, 76620 Le Havre, France; Luc Meinerad, 161, rue Victor Hugo, 76600 Le Havre, France

[21] Appl. No.: 20,499

[22] Filed: Mar. 14, 1979

[30] Foreign Application Priority Data

Nov. 17, 1978 [FR] France .................................. 78 32552

[51] Int. Cl.³ ............................................. A01K 97/06
[52] U.S. Cl. ................................................. 43/57.5 R
[58] Field of Search ........... 43/57.5 R, 57.5 A, 54.5 R

[56] References Cited
U.S. PATENT DOCUMENTS

| | | | |
|---|---|---|---|
| 2,447,105 | 8/1948 | Vogel | 43/57.5 R |
| 2,765,576 | 10/1956 | Kurek | 43/54.5 R |
| 3,332,164 | 7/1967 | Parrett | 43/57.5 R |
| 3,512,295 | 5/1970 | La Barge | 43/57.5 R |
| 4,073,085 | 2/1978 | Stremeckus | 43/54.5 R |

Primary Examiner—Nicholas P. Godici
Attorney, Agent, or Firm—Cushman, Darby & Cushman

[57] ABSTRACT

The spinner case for tidyingly supporting and arranging fishing spinners comprises a body and a cover member hingedly supported on said body. A series of parallel recess are formed in a peripheral surface of the body and a pair of elongated holes are formed in a wall member of the body substantially perpendicular to the peripheral surface, each pair of holes corresponding to a recess for receiving two arms of a hook of a spinner, the shank of which being received within the corresponding recess. The cover comprises two mutually perpendicular wall portions which can be brought in at least a relative position of the cover with respect to the body wherein the wall portions extend substantially parallel to and at a distance from said peripheral surface and the adjacent wall member, respectively. In a particular embodiment, the body and the cover are cylindrical and rotatable one relative to each other. An aperture formed in the cover gives selectively access to a group of holes and recess.

13 Claims, 13 Drawing Figures

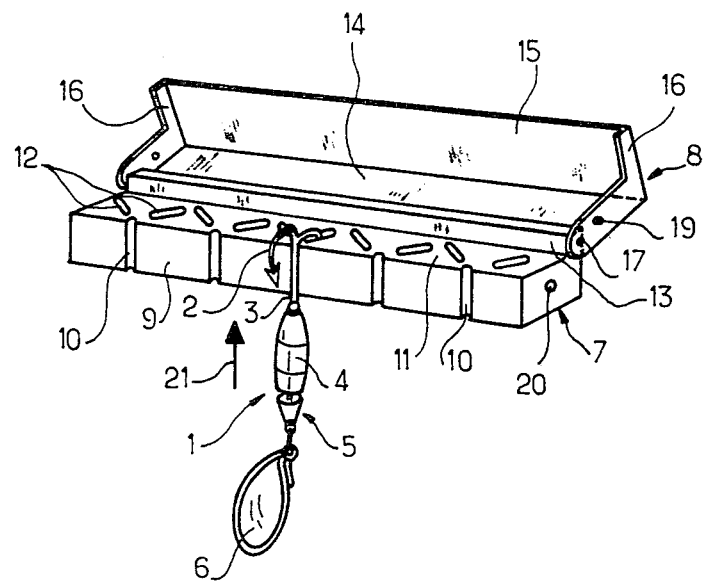
Fig: 1
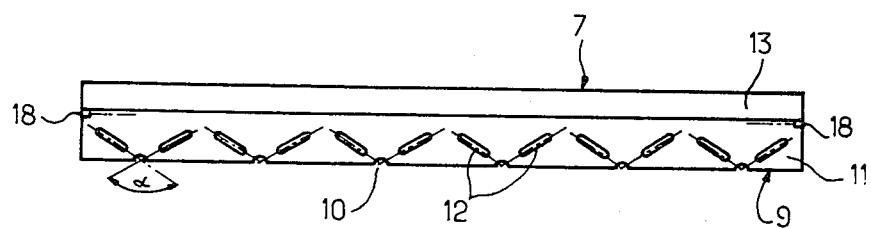
Fig: 2
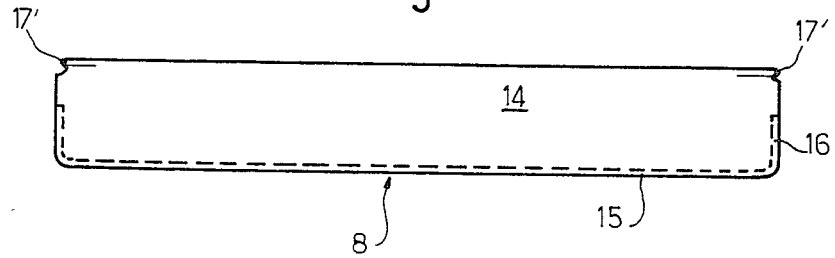
Fig: 3

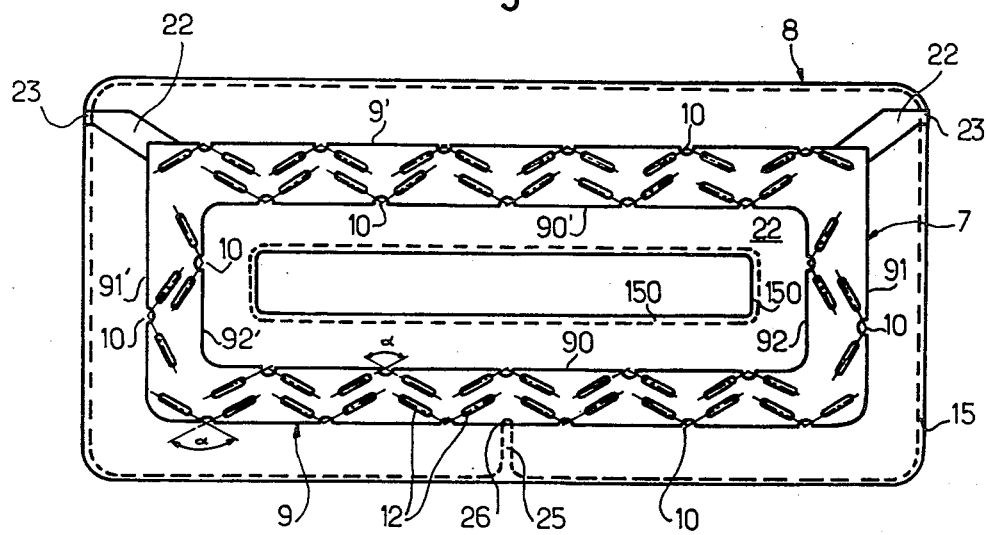
Fig: 4
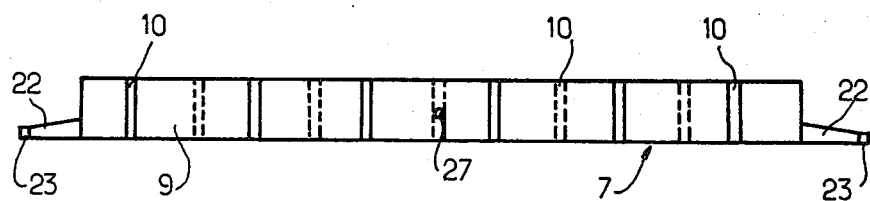
Fig: 5
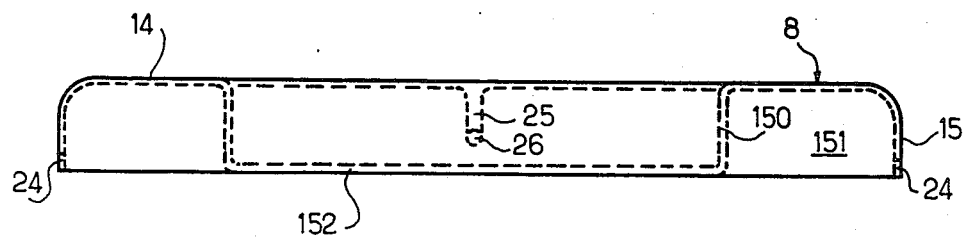
Fig: 6

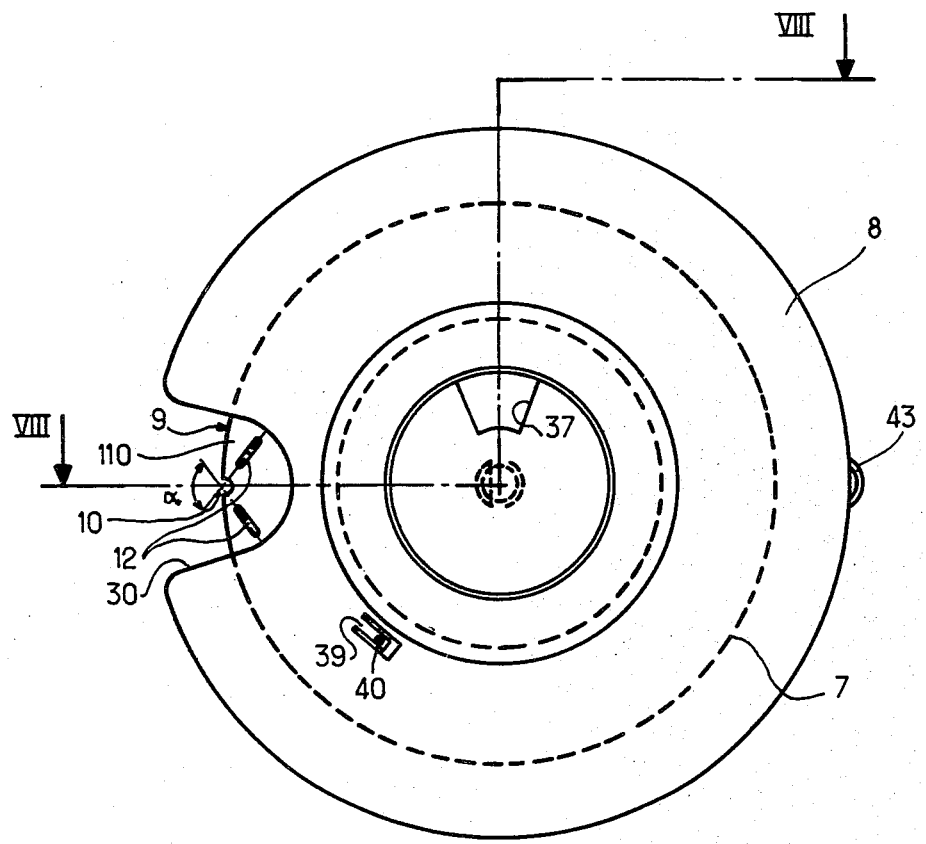
Fig: 7
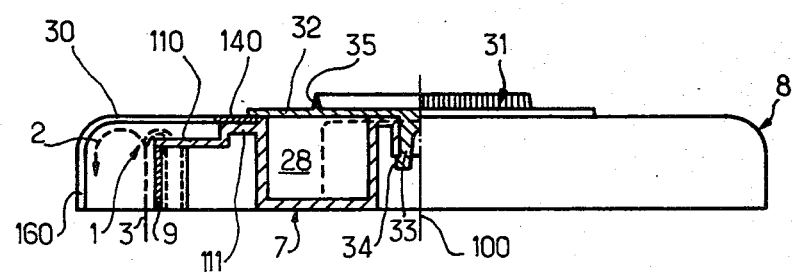
Fig: 8

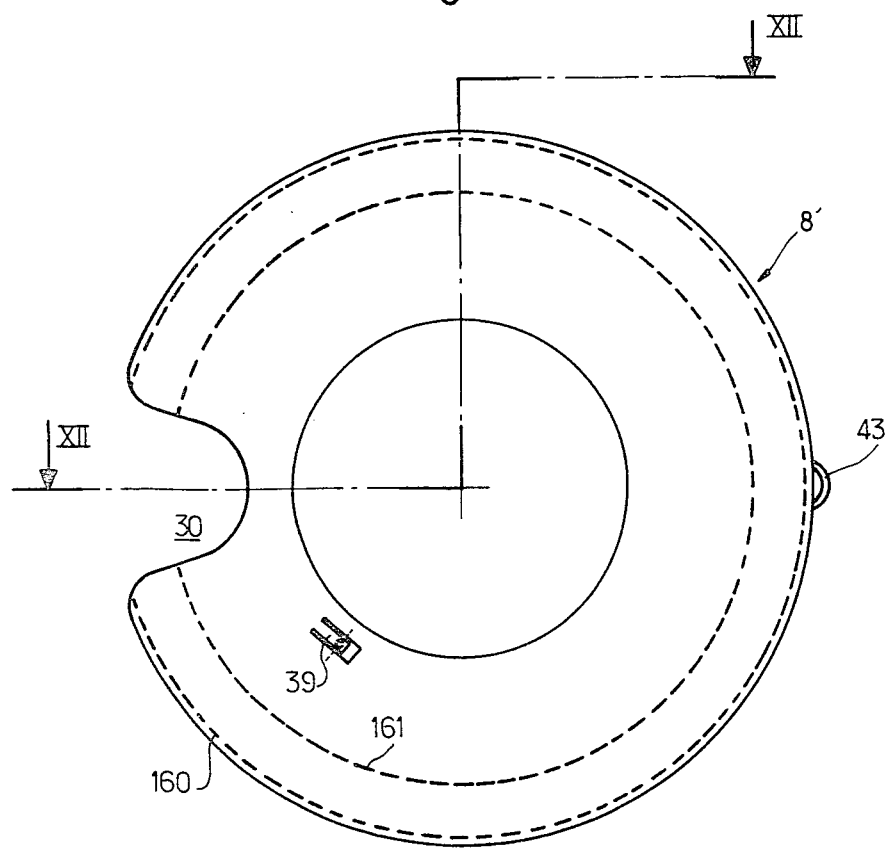
Fig: 11
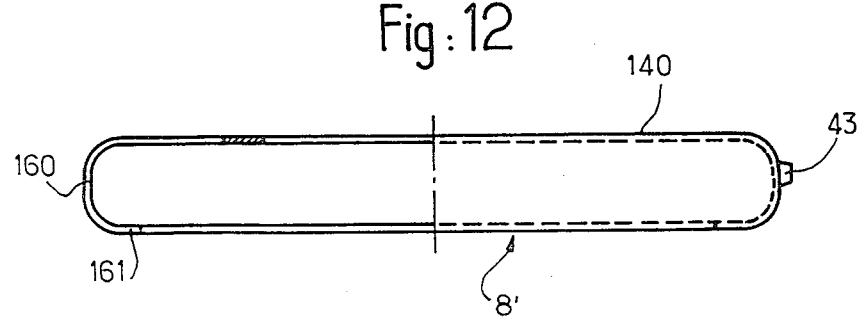
Fig: 12

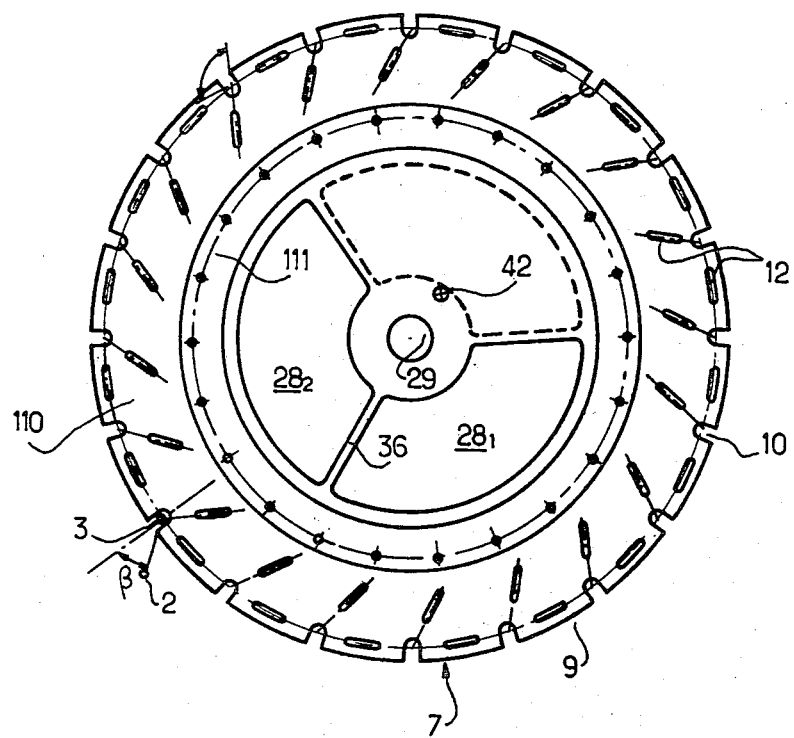
Fig: 13

SPINNER-CASE

BACKGROUND OF THE INVENTION

1. Field of the Invention

The present invention relates to a fishing case and, more particularly, to a spinner case.

2. Description of the Prior Art

The spinners or spoon-baits, which are widely used for bait casting or spinning, have a composite structure comprising, as shown in FIG. 1, a distal portion forming a hook 2 with two or three arms joined into a shank 3 which is prolongated by an adjustable weight or sinker 4 and, through a swivel 5, by a spoon 6 which is mounted to spin or wobble through water so as to constitute a lure for the carnivorous species. At the present time, the spinners are available in bulk in plastic boxes or individually. When the angler has to take one of his spinners, which are generally of three types: n° 1, n° 2 and n° 3, depending upon the particular fish, said spinners are quite ineluctably tangled and the angler is compelled to free the selected spinner from an inextricable tangling of spinners. In doing this, there are frequent risks of having at least a spinner falling down, more particularly in the water, with additional risks for the user to be occasionally seriously pricked.

BRIEF SUMMARY OF THE INVENTION

Objects of the Invention

There is an object of the invention to overcome the above identified problems by providing a case for arranging and housing spoon-baits or spinners which is of a simplified construction, which permits to easily and tidyingly arrange the spinners without the risks for the user to be wounded, and which is realized in the form of a compact, portable structure for hanging to the jacket or around the neck of the user.

In order to meet these objects and other which will become apparent from the following description, such a tidying case comprises a body having at least a peripheral surface and at least a wall member adjacent to said peripheral surface and substantially perpendicular thereto, said peripheral surface having at least a series of parallel recesses extending in the direction substantially perpendicular to said wall member for receiving the shank of the hook of the spinner, said wall member having, adjacent each said recess, a pair of holes for receiving two adjacent arms of said hook of said spinner, and a cover member hingedly mounted on said body, said cover member comprising two mutually substantially perpendicular walls defining a back portion and a flange portion, said cover member being mounted so as to be brought in at least a position relative to said body with said back portion extending substantially parallel to and separated from said wall member, and with said flange portion extending substantially parallel to the peripheral surface and separated therefrom in the direction opposite to said wall member.

According to an aspect of the invention, the body has a substantially parallelepipedic configuration, the cover being hingedly mounted around an axis extending parallel to the main direction of said parallelepipedic body.

According to another aspect of the invention, the body is substantially cylindrical, the cover having the form of a cylindrical cupola having a skirt portion capping the periphery of the body, said cover member being mounted so as to be rotatingly movable relatively to the body around the axis thereof, an aperture being formed in the cover to selectively give access to an angularly limited zone of the body adjacent the periphery thereof.

BRIEF DESCRIPTION OF THE DRAWINGS

Preferred embodiments of the invention are illustrated by way of examples in the accompanying drawings in which:

FIG. 1 is a perspective view of one embodiment of the case of the invention;

FIGS. 2 and 3 are top-views respectively showing the body and the cover member of another form of the case of FIG. 1;

FIG. 4 is a top-view of another form of the tidying case of the invention, the cover member being supposed transparent;

FIGS. 5 and 6 are front views respectively showing the body and the cover of the case in FIG. 4;

FIG. 7 is a top-view of another form of the case of the invention;

FIG. 8 is a half vertical section along lines VIII—VIII of the case shown in FIG. 7;

FIG. 11 is a top-view of another form of the cover of the case shown in FIG. 7;

FIG. 12 is a half vertical section along the lines XII—XII of the cover shown in FIG. 11; and FIG. 13 is a top-view of an alternative form of the body of the case shown in FIG. 7.

DETAILED DESCRIPTION OF THE DRAWINGS

Figure 9:
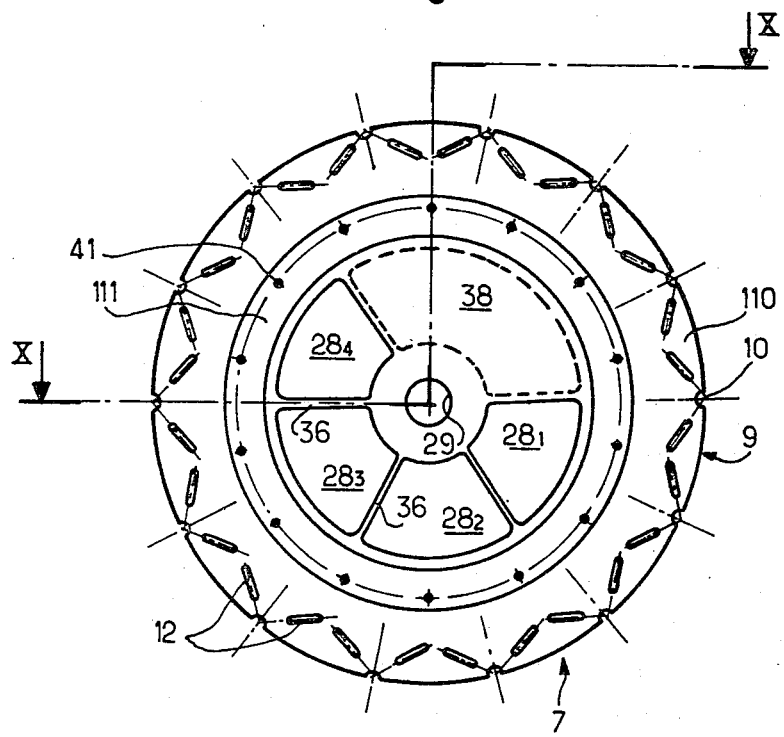
FIG. 9 is a top-view of the body of the case shown in FIG. 7.

In the embodiments shown in FIGS. 1 to 3, the case 1 for arranging and housing spinners comprises a body generally designated 7 and a cover member generally designated 8 which is pivotingly mounted on the body. The body 7 has a generally parallelepipedic configuration, and one of the main lateral faces thereof, designated 9, comprises a series of recesses or grooves 10 having a section substantially in the form of arc of a circle and extending in the direction substantially perpendicular to the upper and lower faces of the body 7. The upper portion of the body 7 comprises a flat surface 11 extending perpendicularly to the lateral face 9 and provided with a series of pairs of holes 12, each pair associated respectively to a recess 10.

As best seen in FIG. 2, the holes 12 of each pair of holes are elongated in cross-section to accomodate different dimensions of the hooks of the spinners, the main axes of the elongated holes 12, as taken in cross-section, being symetrically angularly spaced with respect to the corresponding recess 10 of an angle $\alpha$, for instance 120°, the end of the elongated holes 12 adjacent to the corresponding recess 10 being located at a distance from said recess lower than the conventional dimension of the smaller hooks of the spinners.

The upper part of the body 7 advantageously comprises a longitudinal portion 13 upwardly off-set or raised with respect to the plane of the upper surface 11 and serving for the mounting of the cover member 8. Said cover member generally comprises a first wall portion forming a back 14 and a second wall portion forming a flange 15 which extends perpendicularly to the wall portion 14 and two lateral or end walls 16. In the embodiment shown in FIG. 1, the end walls 16 comprise hinge pivots 17 which are received within holes formed in the end faces of the raised portion 13. In the embodiment shown in FIGS. 2 and 3, the end of the wall portion 14 forming the back of the cover member comprises pivots elements 17' to be received within eyes 18 provided on the front face of the raised portion 18.

In both embodiments, the spinners are arranged as follows: the user holding a spinner by one of the arms of the hook introduces the two other arms, which are generally separated of an angle of 120°, in a pair of holes 12, the shank 3 of the hook being thus received within the corresponding recess 10. The height of the body 7 is determined so as to be slightly lower than the conventional length of the shanks 3 of the hooks, but greater than the length of the folded barbed portion of the arms 2 of the hooks. Thus, by turning down the cover member 8 around the axis defined by the pivot elements 17 or 17', the back portion 14 of the cover is brought in a position where it extends parallel to the face 11, slightly separated therefrom, the flange portion 15 being brought in a position where it extends parallel to the front face 9 of the body provided with the recesses 10, at a distance therefrom greater than the distance that normally extends the free arm 2 of the hook mounted within the body 7. When the cover is in its closed position, it is thus obtained a tidying case from which only protrude downwardly the not-injuring portions of the spinners (sinker, spoon), the hook portions and their barbs being not directly accessible, but protected by the cover. Said cover further prevents the spinners arranged within the body 7 of escaping, whatever the orientation of the closed case is. To lock the cover in a closed position, there are provided cooperating means on the cover and on the body, for instance in the form of rounded studs 19 provided on the inner face of the sides 16 for cooperation with recesses 20 formed in the end faces of the body 7.

For extracting or changing a spinner, the angler, which may carry the case around the neck, over the shoulder or hanging to his jacket, opens the cover member 8, holds the selected spinner in the case by the free arm of its hook 2 and raises slightly the spinner in the direction indicated by the arrow 21 to extract the hook out of the holes 12 in the body 7, without disturbing the other spinners mounted on the body.

In the embodiment shown in FIGS. 4 to 6, the body 7 also presents a generally parallelepipedic shape but with a rectangular central opening 22, whereby said body has generally the form of a rectangular torus having a rectangular or square section. In said embodiment, in addition to the main lateral face 9 the body 7 offers the symetrical main face 9', the inner longitudinally extending lateral faces 90 and 90' of the torus, the outer 91 and 91' and inner end faces 92 and 92' to the arrangement of a great number of recesses or grooves 10 similar to those disclosed with reference to FIG. 1. As in the first embodiment, to each recess 10 corresponds a pair of elongated holes 12 angularly spaced of 120°, and symetrically disposed with respect to the corresponding recess 10 so as to receive the arms of a hook.

In said embodiment, the cover 8 also presents a generally parallelepipedic form with a top plate forming a back 14, and a peripheral skirt forming a flange portion 15 defining four wall portions perpendicular mutually and to the plane of the top plate forming a back 14.

Additionally, the cover member comprises a second or inner skirt 150 defining second wall portions perpendicular to the plane of the top plate 14 and respectively parallel to the corresponding wall portions of the outer skirt 15. The inner skirt 150 is advantageously prolongated at its lower end by a bottom plate 152 integral therewith which extends substantially in the plane of the lower edge of the outer skirt, i.e. in the closed position of the cover substantially in the lower plane of the body 7. Skirts 15 and 150 thus define an annular space having a rectangular cross-section 151 for receiving the body 7, said body being, in the closed position of the cover, totally encompassed within the annular space 151 defined by the cover member.

Adjacent the corners of one of its main lateral faces, the body 7 comprises two arms 22 which protrudingly extend from the body towards two perpendicular directions, i.e. substantially along the bisectrix of the considered corners. The arms 22 are terminated by pivot elements 23 in alignment one with the other and which both extend in a direction parallel to the main direction of the parallelepipedic body 7. Said pivot elements are received within recesses 24 formed within the facing lateral small faces of the outer skirt 15 of the cover member 8. The main lateral face of the outer skirt 15 of the cover member 8 is advantageously formed with an inner ribbing 25 prolongated by a protuberance 26 arranged to be received within a recess 27 formed in the corresponding face 9 of the body 7 so as to selectively lock the cover member in its closed position. It will be understood that, in said embodiment, it is possible to arrange a number of spinners considerably greater than in the embodiment shown in FIG. 1, for instance up to 26 spinners.

Referring to FIGS. 7 to 13, there is shown an other embodiment of the tidying case of the invention. In said embodiment the body 7 has a generally straight cylindrical shape aroung a center axis 100 with a peripheral cylindrical wall 9 and a flat annular surface 110 adjacent and perpendicular to the wall 9 for connecting said peripheral wall 9 to a central portion which forms an inner annular chamber 28, opened at its lower end, and a sleeve member defining a central bore 29. More specifically, the annular surface 110 is connected to the central portion by a second annular wall 111 which extends in a plane parallel to and slightly upwardly off-set with respect to the plane of the annular wall 110, so as to define with the central portion a shoulder 112 (FIG. 10) serving as a bearing for the top wall 140 of the cover member 8. In said embodiment, the cover member 8 has a form of the cylindrical cupola or cap with a cylindrical peripheral wall or skirt 160 having a height at least equal to the thickness of the body 7.

As in the preceding embodiments, recesses or grooves 10 are formed in the outer surface of the cylindrical peripheral wall 9 of the body and extend each parallel to the symmetry axis 100 of the body 7 and of the cover member 8. The paired elongated holes 12, angularly spaced in a pair of an angle α of 120° and symetrically arranged with respect to the radial direction of the corresponding recess 10, are formed in the annular wall 110. An aperture 30, in the form of a circular sector, is formed in a peripheral zone of the cover member 8, i.e. more specifically, in an outer zone of the top wall forming back 140 and all over the height of the skirt 160 so as to expose an angular portion of the periphery of the body 7 corresponding, as best shown in FIG. 7, to a pair of elongated holes 12 and the corresponding recess 10, whereby permitting insertion and extraction of a selected spinner among the spinners mounted in the body, the other groups of holes and recesses, with other spinners received therein, being hidden and covered by the cover member 8.

The cover member is mounted so as to bear upon the second annular surface 111 and to be journalled on the body while being centered by the shoulder 112. The cover member is rotatingly retained on the body by a retaining member designated 31 comprising a radially outwardly extending circular flange 32, the outer periphery of which slightly overlays the inner circular edge of the top wall forming the back 140 of the cover member, and a downwardly protruding locking central portion 33 which is received within the central bore 29 of the central portion of the body and which is provided with resilient locking noses or fingers 34 cooperating with the lower end of the wall of the bore 29. The retaining member 31 also comprises a ribbed cylindrical outer portion 35 serving for rotating the retaining member as it will be seen hereinbelow.

According to a further feature of the invention, the inner annular chamber 28 in the central portion of the body 7 is divided by radial partition walls 36 in a determined number of individual chambers $28_i$. An opening 37 formed within the retaining member 31 selectively gives access to the different individual chambers $28_i$. Advantageously, an angular zone of the central portion of the body is not formed with an accessible individual chamber $28_i$ and is accordingly obturated by an upper wall 38 with which the opening 37 may be selectively registered to have the different chambers $28_i$ obturated by the central flange portion of the retaining member, for instance for transporting or storing the spinner case.

In the embodiment shown in FIGS. 7 to 10, the body 7 has the groups of paired elongated holes 12 and recesses 10 arranged so as the holes 12 of each pair of holes are located symetrically with respect to the radial direction of the corresponding recess 10. In the embodiment shown in FIG. 13, the elongated holes 12 of a pair of holes corresponding to a recess 10 are angularly off-set so as to be located symetrically with respect to a direction forming with the radial direction of the corresponding recess 10 and angle $\beta$ comprised between about 30° and 45°. In said configuration, the free arm 2 of the hook of a spinner mounted in the body 7 does not extend radially as in the embodiments in FIGS. 7 to 10, but slightly obliquely, whereby permitting to reduce the outer transversal dimensions of the case.

In any of the cylindrical embodiments, there is advantageously provided on the cover 8 at a resilient tongue 39 having on its inner face adjacent its free end a protrusion 40 for cooperation with a series of angularly spaced recesses 41 formed in the second annular surface 111 of the body, said recesses being angularly spaced to correspond to the repartition of the groups of elongated holes and recesses 10 on the periphery of the body. Said locking system thus allows the cover member 8 to be locked in an angular position where the opening 30 is in an intermediary position straddling two adjacent spinners, whereby preventing the spinners from being extracted or from falling down out of the case.

In a similar manner, the retaining member 31 may also comprise a resilient tongue for cooperation with a recess 42 formed in the central portion of the body so as to lock the retaining member in a position where the opening 37 overlays the blind portion or upper wall 38, i.e., in a position hiding all the individual inner chambers $28_i$ as above mentioned. Said chambers may be of use for tidying or arranging sinkers, swivels or spoons for the spinners.

The constitutive parts of the case of the invention are advantageously made of a molded plastic material, such as ABS, polypropylene or polyethylene. At least the cover member as also preferably the retaining member are realized in a transparent plastic material. As shown in FIG. 7, at least one of the main constitutive elements, for instance the cover, is provided with a hooking hook or buckle 43 made of a single piece with the corresponding constitutive element for facilitating the carrying or the holding of the case.

Figure 10:
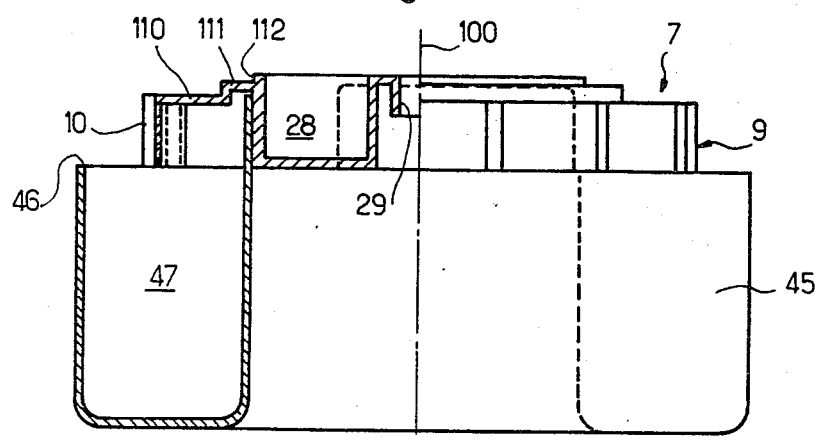
FIG. 10 is a half vertical section along the lines X—X of the body shown in FIG. 9 provided with a protecting casing.

While particular embodiments of the invention have been illustrated and described, further modifications and improvements will appear to those skilled in the art. More particularly, as shown in FIGS. 11 and 12, the cover member 8', made of a slightly resilient plastic material, may comprise at the lower end of the skirt 160 a radially inwarding extending flange 161 whereby providing a better protection for the spinners and an improved security for the user. The case may also comprise, as shown in FIG. 10, a lower cylindrical casing 45 having substantially the same diameter as the skirt 160 and adapted to be mounted on the lower end of the body 7; for instance the casing 45 may be fitted on the outer periphery of the central portion of the body 7 which defines the inner chambers $28_i$, with the annular outer edge 46 of the casing extending substantially in the same plane as the annular lower edge of the skirt 160. Said casing thus defines besides the body 7 an annular chamber for receiving and protecting the hanging parts (sinkers, spoons) of the spinners in the body 7. With such an arrangement, the tidying case becomes a closed storing case permitting an easy and convenient storing of the spinners.

What we claim is:

1. A case for tidying fishing spinners, which comprises a body having at least a peripheral surface and at least a wall member adjacent and substantially perpendicular to said peripheral surface, said peripheral surface being provided with a series of parallel recesses each extending in a direction substantially perpendicular to said wall member for receiving the shank of the hook of a spinner, said wall member being formed adjacent each said recess with a pair of holes for receiving two adjacent arms of the hook of a spinner, said holes of each of said pair of holes being substantially centered on axes which cross adjacent each said recess, said axes being angularly spaced at about 120° with respect to each other, said recess consisting in a substantially cylindrical groove formed in said peripheral surface, and a cover member hingedly mounted on said body, said cover member comprising two mutually perpendicular walls defining a back portion and a flange portion and being movable with respect to said body towards at least a position relative to said body wherein said back portion of said cover member extends substantially parallel to and separated from said wall member and said flange portion of said cover member extends substantially parallel to said peripheral surface, at a distance therefrom in the direction opposite to said wall member.

2. A case according to claim 1, wherein said holes are each elongated with respect to each respective said axis, said axes of the holes of a said pair of holes crossing substantially inside the corresponding said recess.

3. A case according to claim 2, wherein said body is of a substantially parallelpipedic shape and has a main direction and main lateral faces and end front faces extending substantially perpendicularly to said main lateral faces, said peripheral surface comprising at least one of said main lateral faces of said parallelpipedic body and said wall member comprising an adjacent face of said parallelpipedic body, said cover member being pivotally mounted on said body around an axis extending parallel to said main direction of said parallelpipedic body.

4. A case according to claim 3, wherein said body has the form of a rectangular torus of a rectangular cross-section which defines a substantially rectangular inner opening, said recesses being formed on at least portions of inner and external lateral faces of said body, said cover member having a substantially parallelepipedic outer shape and comprising a substantially plane top plate, first wall portions extending perpendicularly to said plate at the periphery thereof and second wall portions extending perpendicularly to said plate and respectively parallel to and separated from said first wall portions, whereby defining respectively with said first wall portions a substantially toroidal chamber having a rectangular cross-section for receiving said body.

5. A case according to claim 4, wherein said cover member is pivotingly mounted on protrusions integral with said body and extending off-set therefrom.

6. A case according to claim 1, wherein said body is cylindrical around a symmetry axis, said recesses being formed in the outer cylindrical wall of said body and extending parallel to said axis, said body having at least an annular portion adjacent and perpendicular to said outer cylindrical wall wherein said pair of holes are formed, said cover member having the general shape of a cylindrical cupola with an annular back portion and a cylindrical skirt portion capping said body, said cover member being mounted by its back portion onto a central portion of said body so as to be rotatable around said axis, an aperture being formed in a portion of said cover member for selectively giving access to an angularly delimitated zone of said body adjacent the periphery thereof.

7. A case according to claim 2, wherein said body is cylindrical around a symmetry axis, said recess being formed in the outer cylindrical wall of said body and extending parallel to said axis, said body having at least an annular portion perpendicular and adjacent to said outer cylindrical wall wherein said pair of holes are formed, said cover member having the general shape of a cylindrical cupola with an annular back portion and a cylindrical skirt portion capping said body, said cover member being mounted by its back portion onto a central portion of said body so as to be rotatable around said axis, an aperture being formed in a portion of said cover member for selectively giving access to an angularly delimitated zone of said body adjacent the periphery thereof.

8. A case according to claim 7, wherein said annular back portion of said cover member is journalled on said central portion of said body, said cover member being rotatingly retained onto said body by a central retaining member removably mounted onto said body for rotation about said axis of said body.

9. A case according to claim 8, wherein said body and said cover member comprises resilient locking means for selectively releasably locking said cover member in a relative angular position with respect to said body wherein said aperture in said cover member is registered with an intermediate portion of said body between two adjacent groups each formed of a said recess and of the corresponding said pair of elongated holes.

10. A case according to claim 9, wherein said central portion of said body defines inner chambers separated one from each other by radially extending partition walls, said inner chambers being selectively obturated by said retaining member, a second aperture being formed within said retaining member for selectively giving access to said inner chambers when said retaining member is rotated with respect to said body.

11. A case according to claim 3, wherein said body and said cover members are made of a plastic material.

12. A case according to claim 6, wherein said body and said cover member are made of a plastic material.

13. A case according to claim 12, wherein at least said cover member is made out of a transparent plastic material.

* * * * *